United States Patent [19]

Öhrle

[11] Patent Number: 5,064,241
[45] Date of Patent: Nov. 12, 1991

[54] CLOSING DEVICE FOR CONVERTIBLE VEHICLES

[75] Inventor: Rolf Öhrle, Herrenberg, Fed. Rep. of Germany

[73] Assignee: Daimler-Benz AG, Fed. Rep. of Germany

[21] Appl. No.: 550,441

[22] Filed: Jul. 10, 1990

[30] Foreign Application Priority Data

Jul. 22, 1989 [DE] Fed. Rep. of Germany ....... 3924295

[51] Int. Cl.⁵ .............................................. B60J 7/18
[52] U.S. Cl. .............................. 296/121; 292/DIG. 5
[58] Field of Search .............. 296/121, 107, 108, 116, 296/117, 224; 292/DIG. 5

[56] References Cited

U.S. PATENT DOCUMENTS

| | | | |
|---|---|---|---|
| 3,216,763 | 11/1965 | Heincelman | 296/121 |
| 3,353,864 | 11/1967 | Antaya et al. | 296/121 |
| 3,425,742 | 2/1969 | Rauber, Jr. | 296/121 |
| 4,618,180 | 10/1986 | Muscat | 296/121 |
| 4,664,436 | 5/1987 | Eyb | 296/121 |
| 4,819,983 | 4/1989 | Alexander et al. | 296/121 |
| 4,830,425 | 5/1989 | Muscat | 296/107 |
| 4,830,426 | 5/1989 | Schlachter et al. | 296/121 |

*Primary Examiner*—Robert R. Song
*Attorney, Agent, or Firm*—Evenson, Wands, Edwards, Lenahan & McKeown

[57] ABSTRACT

A pull-to device pulls a vehicle closing component into a locked end position automatically in a final closing-movement phase. Whereas prior pull-to devices formed by a closure or even by a plurality of closures were effective only after the closing component has reached a pre-engagement position on the counter-component, here, during the closing movement, this pre-engagement position is assumed large independently of the closing accuracy of the closing component. For assistance, there is an additional pull-to device which consists of a leading catch coupling.

9 Claims, 3 Drawing Sheets

CLOSING DEVICE FOR CONVERTIBLE VEHICLES

BACKGROUND AND SUMMARY OF THE INVENTION

The invention relates to a device for a closing component of a vehicles, and, more particularly, to a device with a lock stud interacting with a closure such that the lock stud is grasped by the closure and is pulled out of a prelocked initial position into a completely locked end position.

A device is used in the convertible series Mercedes-Benz R 129 series and is provided between the roof frame above the windscreen and a roof cover of the automatically actuable folding top. This device comprises two mirror-image rotary latch closures arranged at a distance from one another on the roof frame and interacting with rigid lock studs arranged on the roof cover.

So that, in a final closing phase of the folding top, the lock studs can penetrate reliably into the insertion orifice of the associated rotary-latch closure, the insertion orifices are respectively located behind a funnel-shaped centering shell which is itself set into a trim covering the roof frame. Because of this, the lock studs have to penetrate deep into the trim of the roof frame even before they can run onto the forked rotary latch of their rotary-latch closure and thereby bring about the pre-engagement position. As soon as the forked rotary latches have reached their pre-engagement position, they are each rotated automatically into their main engagement position by an associated hydraulic cylinder. The lock studs are thereby pulled into their locked end position, and the roof cover is taken up into its closing position.

This pulling of the folding top by the locking advance of the rotary-latch closures functions reliably after the lock studs have reached their pre-engagement position during the closing advance of the closing top. Under customary operating conditions, by exact adjustment of the folding-top structure, together with the lock studs or rotary-latch closures, it is initially possible to ensure that the lock studs are pressed into their prelocked position during the automatic closing of the folding top.

At extreme temperatures, with phenomena of wear of the joints of the folding top structure and on the slight bending deformations of individual rod members of the folding-top structure, a tilting of one or both lock studs in the centering shell can occur, after which the lock studs can no longer be pressed into the rotary-latch closures via the pivoting drive of the folding top.

In such cases, the roof cover has to be pulled forwards manually, until the lock studs have engaged into the rotary-latch closures. Only thereafter is the roof cover pulled into its closing position by its locking advance. A fully automatic actuation of the folding top in response to simple switch pressure is therefore no longer guaranteed.

An object of the present invention is to improve a closing device so that, even when during the closing movement of the closing component a lock stud is in a position which further advance thereof in the depression for effecting the closure, an automatic locking of the closing component with a counter-component can still be brought about.

The foregoing object has been achieved in accordance with the present invention by providing that the pulling travel of the closure can be preceded by a pulling travel of a catch coupling, or that the pulling travel of the closure can be overlapped by an appropriately larger pulling travel of the catch coupling. The catch coupling can consist of a second closure which likewise interacts with a lock stud. However, the utilization of a combination of a closure and an associated lock stud as a catch coupling presupposes that a positive coupling can take place largely independently of the relative position of the lock stud in relation to the closure at the moment of their meeting, and that a sufficient advance of the grasped lock stud in the closure remains possible.

The catch coupling can be constructed as a closure of the type shown, for example, in German Patent Specification 1 555 098, which is actuated by a pressure medium and in which a catch lug interacts with a closing wedge longitudinally movable via a hydraulic cylinder. The closing wedge can be countersunk in the counter-component and nevertheless allow a positive coupling even after only a small advancing travel of the catch lug through a catch orifice of the counter-component.

The pulling device of the present invention is especially suitable for closing components of relatively low closing accuracy, as is true of the roof cover of an automatically actuable vehicle folding top, which can be interlocked with the front roof frame of the body two closures. A single catch coupling can be arranged approximately centrally between the two rotary latch closures so that only a single catch coupling is required for both rotary closures. Alternatively, however, it is also possible to assign a catch coupling to each of the two rotary-latch closures.

It is also presently preferable to provide a uniform linear drive of the rotary-latch closures and of the catch coupling or catch couplings. In this case, all the drive members, such as, e.g., hydraulic cylinders, can be loaded by a common pressure source.

BRIEF DESCRIPTION OF THE DRAWINGS

These and other features, objects and advantages of the present invention will become more apparent from the following detailed description of a presently preferred embodiment when taken in conjunction with the accompanying drawings wherein.

DETAILED DESCRIPTION OF THE DRAWING

Figure 1:
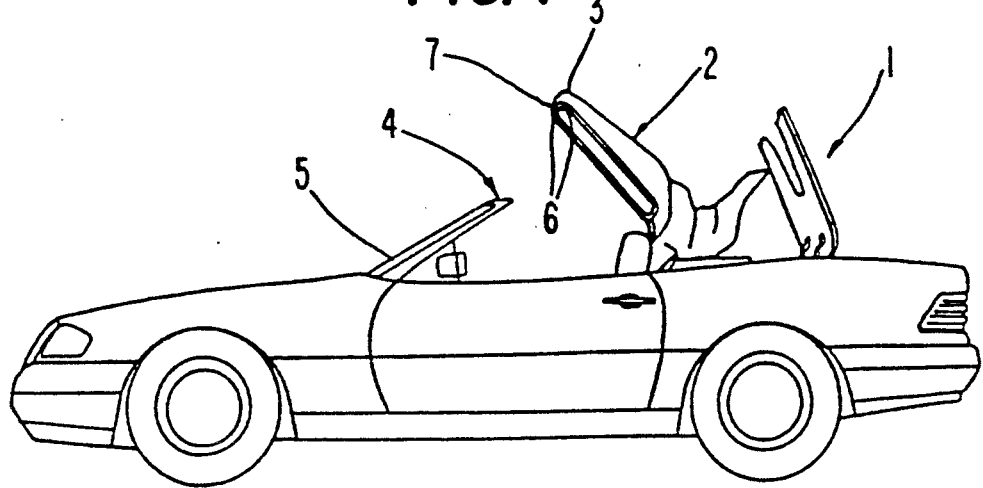
FIG. 1 is a side elevational view of a convertible vehicle with the folding top partially closed.

A convertible automobile designated generally by the numeral 1 in FIG. 1 is equipped with a folding top 2 which can be opened or closed in response to switch pressure by an electrically controlled hydraulic drive. During the operation of closing the folding top 2, a front roof cover 3 of the folding top 2 moves from the rear forward along a circular path. This circular path is such that, in a final phase of movement driven from the folding top, the roof cover 3 is lowered from above onto a front roof frame 4 which extends above a windscreen 5 in the width-wise direction of the convertible vehicle 1. The roof cover 3 lowered onto the roof frame 4 is subsequently to be pulled up against the roof frame 4 by an automatic device into a sealed closing position and interlocked with the roof frame 4.

To make this closing position possible, two U-shaped lock studs 6 and a catch lug 7 project perpendicularly from and are connected to the underside of the roof cover 3. The catch lug 7 is fastened exactly in the longitudinal center of the roof cover 3, and the two lock studs 6 are arranged offset outwards on the roof cover 3 and at the same lateral distance from the catch lug 7. Because of their arrangement on the underside of the roof cover 3, the lock studs 6 and the catch lug 7 are the first members to come up against the roof frame 4 where they penetrate into corresponding orifices 10 and 9, respectively, in the roof frame 4.

Figure 2:
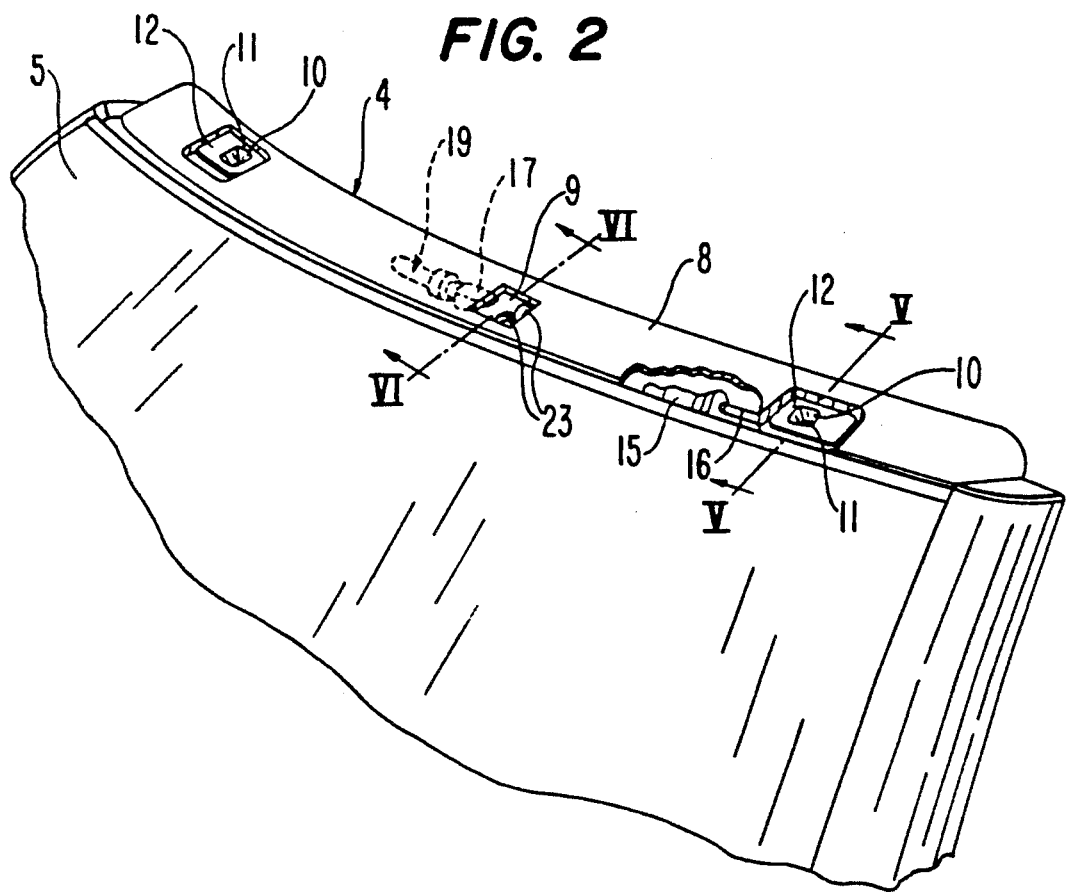
FIG. 2 is a perspective top view of the front roof frame of the convertible vehicle shown in FIG. 1.
Figure 5:
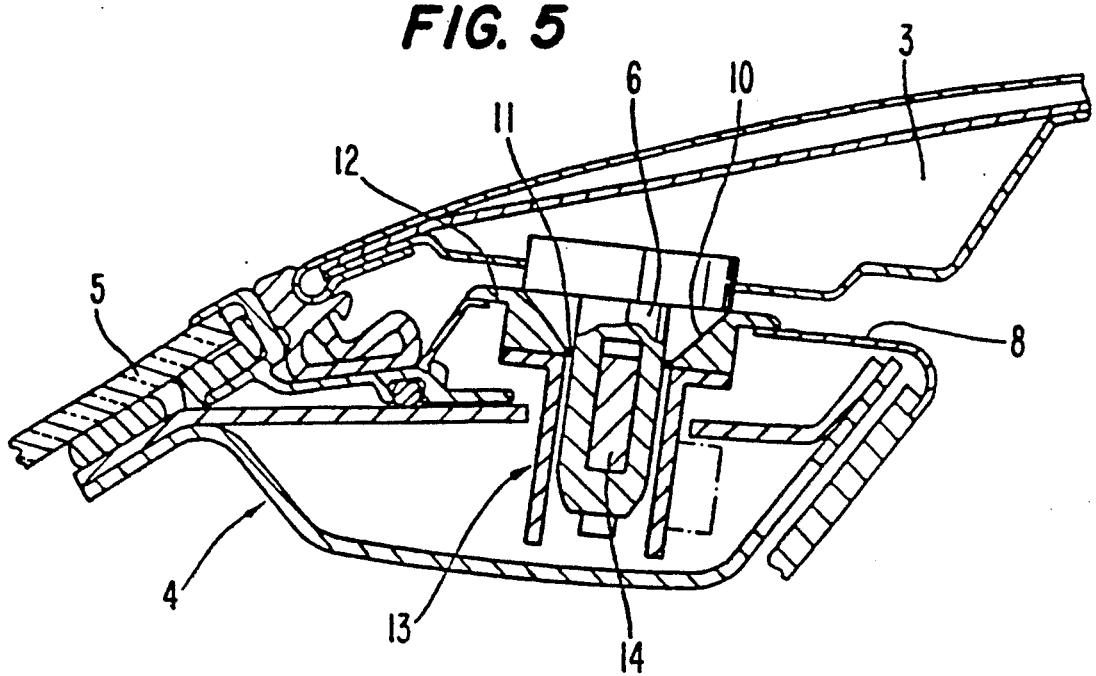
FIG. 5 is a cross-section view through the roof frame, with the roof cover locked, along the line V—V of FIG. 2.

As can be seen in FIG. 2, a rectangular catch orifice 9 in the form of a simple perforation is located in the longitudinal center of trim 8 covering the supporting structure of the roof frame 4 relative to the outside and is assigned to the catch lug 7. Each of the orifices 10 in the roof frame 4 located opposite the lock studs 6 consist, respectively, of funnel-shaped depressions which narrow downwards to form an insertion orifice 11 corresponding approximately to the passage cross-section of the lock studs 6. These depressions 10 are each located in a centering shell 12 countersunk in the trim 8. Underneath each of the two centering shells 12 is arranged a conventional rotary-latch closure 13 (FIG. 5) having a forked rotary latch 14 pivotable in a width plane of the convertible 1. A typical rotary-latch structure principle is shown in German Patent 37 08 095. With the folding top 2 open, the forked rotary latches 14 are maintained by spring force in a release position, in which the fork aperture of the forked rotary latch 14 is located immediately underneath the insertion orifice 11 of the associated centering shell 12. A hydraulic cylinder 15 (FIG. 2) is arranged next to each of the rotary-latch closures 13 on the inside of the roof frame 4 and has a retractable and extendable piston rod 16 which is articulated at the end of the associated forked rotary latch 14.

When the forked rotary latches 14 are rotated into their pre-engagement position by the lock studs 6 centered in the depression 10 during the lowering movement and running onto the fork of the forked rotary latches 14, the hydraulic cylinders 15 are subjected to pressure by automatic control, with the result that the piston rods 16 are extended and thereby rotate the forked rotary latches 14 synchronously into their main engagement position. Since, even as early as in the pre engagement position, a fork half of the associate forked rotary latch 14 engages over a middle leg of the U-shaped lock stud 6, the roof cover 3, pulled by the lock stud 6, is thereby taken up into the closing position, shown clearly in FIG. 5, in which the roof cover 3 is reliably interlocked with the roof frame 4.

However, if the lock studs 6 enter the respective depression 10 at different times or at different angles, they can tilt in the depression 10, thus inhibiting their further insertion advance. So that this inhibition can be overcome, the catch lug 7 constitutes a coupling element of a catch coupling which interacts with a closing wedge 17 arranged underneath the catch orifice 9.

Figure 3:
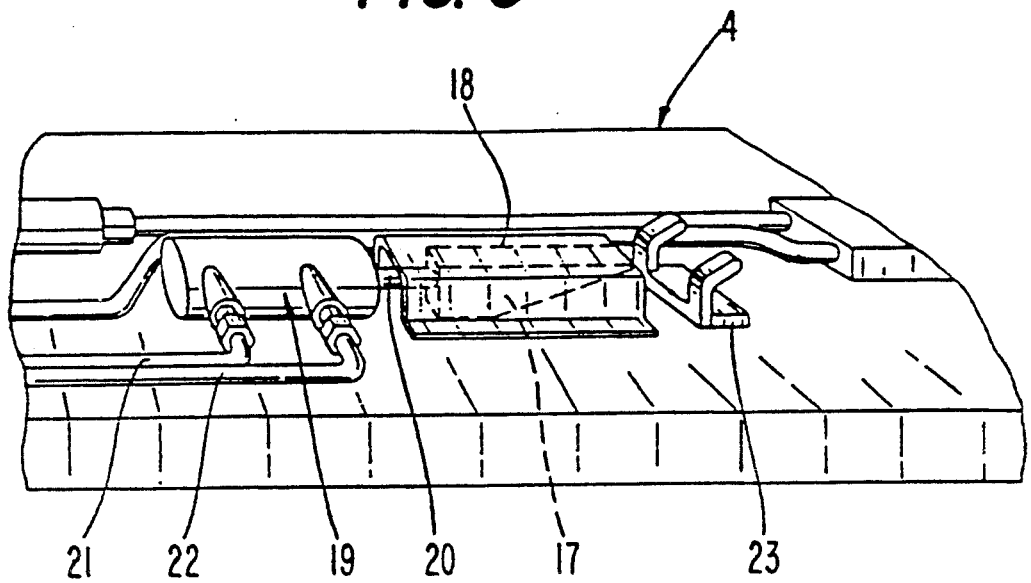
FIG. 3 is a top view of a closing-wedge arrangement in the middle region of the roof frame shown in FIG. 2.

As can be seen more clearly in conjunction with FIG. 3, with the folding top 2 open, the closing wedge 17 is in an initial position in which its wedge knife edge is located immediately underneath the trim 8 next to the right-hand limiting edge of the rectangular catch orifice 9. Starting from the wedge knife edge, the closing wedge 17 extends to the right in the longitudinal direction of the roof frame 4, and it is countersunk in a sliding channel 18. The sliding channel 18 has, over its length, a constant rectangular cross-section whose width is smaller than the width of the catch orifice 9. So that the closing wedge 17 can be guided in the sliding channel 18 securely against rotation, its end located opposite the wedge knife edge is configured as a square to match the cross-section of the sliding channel 18. The underside of the square, extending in a straight line towards the wedge knife edge, merges into an oblique wedge face inclined upwards.

A hydraulic cylinder 19 is arranged coaxially relative to the longitudinal mid-axis of the siding channel 18 and has a retractable piston rod 20 connected at its end to the opposite end of the closing wedge 17 so as to be resistant to tension and compression. Like the two hydraulic cylinders 15, the hydraulic cylinder 19 is also a double-acting working cylinder, the piston of which can be subjected to pressure in opposite directions. It is also connected accordingly to a central pressure source via two supply lines 21 and 22.

Figure 4:
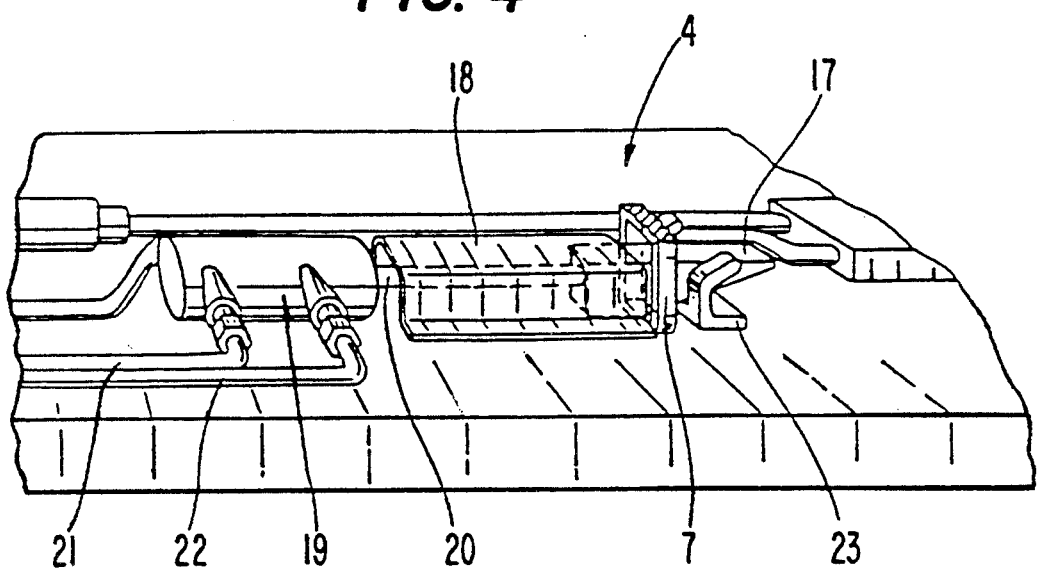
FIG. 4 is a view similar to FIG. 3 but showing the closing-wedge arrangement in the extended state.

The ends of two fork prongs of a centering fork 23 bear against the left hand limiting edge of the catch orifice 9 located opposite the sliding channel 18 and project from below into the catch orifice 9. Starting from their ends, the two fork prongs extend obliquely downwards over a part length of the catch orifice 9, thereafter merging into a vertical, length region and terminating below the sliding channel 18 in a plate like angled portion which connects them and at which they are securely fastened to the roof frame 4. The distance between the fork prongs of the centering fork 23 is somewhat greater than the width of the sliding wedge 17. As can be seen in FIG. 4, during the extension of the piston rod 20 the sliding wedge 17 can thereby be pushed out between the fork prongs of the centering fork 23 into an operating position, in which its wedge knife edge is located on the left of the catch orifice 9.

Figure 6:
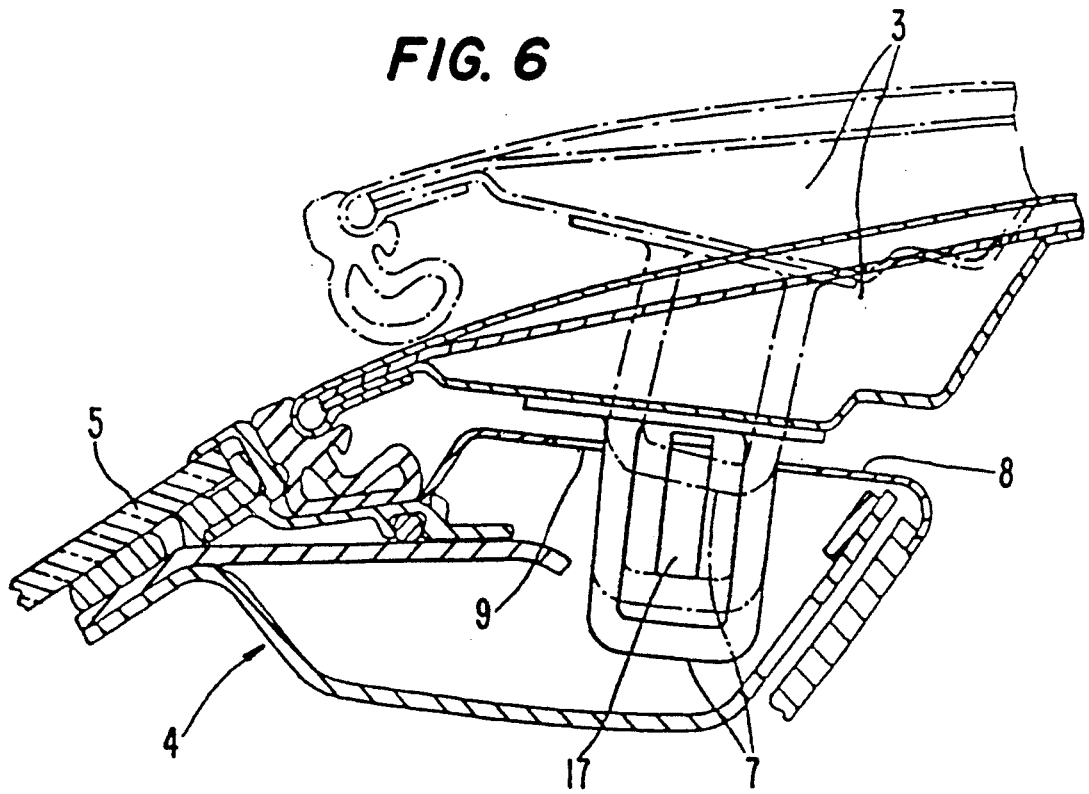
FIG. 6 is a cross-section view through the roof frame, with the roof cover locked, along the line VI—VI in FIG. 2.

FIG. 6 shows how the sliding wedge 17 interacts with the catch lug 7. The catch lug 7 bent out of a U shaped wire bow is, like the lock studs 6, arranged on the roof cover 3 in such a way that its middle leg extends in the longitudinal direction of the vehicle. However, when the insertion length of the catch lug 7 and of the lock studs 6 is essentially the same, the longitudinal extension of the middle leg of the catch lug 7 is substantially larger than the length of the middle legs of the lock studs 6. The spacing thereby present between the side legs of the catch lug 7 amounts to a multiple of the thickness of the closing wedge 17. Furthermore, the engagement length of the catch lug 7 is much smaller than the length of the catch orifice 9.

These dimensions ensure that, during the lowering of the roof cover 3, the catch lug penetrates reliably through the catch orifice 9 into the inside of the roof frame 4 despite possible deviations from its desired insertion path. If, during the lowering operation, there is a lateral deviation from its desired path of movement, the roof cover 3 still runs onto the centering fork 23, thereby resulting in a precentering of the roof cover 3 which is effective only in the width direction of the folding top 2.

If the lock studs 6 have run on in the depression 10 in such a way as to inhibit further advance, the middle leg of the catch lug 7 has already passed through the catch orifice 9 to such an extent that it is located below the wedge knife edge of the closing wedge 17. This position is indicated by broken lines in FIG. 6. When the closing wedge 17 is now moved along by extending the piston rod 20, it engages with its wedge face over the middle leg of the catch lug 7 after even only a short push-out travel. During the further pushing-out movement into its position shown in FIG. 4, the catch lug 7 is pulled further downwards, since the middle leg of the catch lug 7 slides downwards on the wedge face of the closing wedge 17. Since the middle leg is, at the same time, guided vertically along on the centering fork 23, the longitudinal force component on the inclined plane of the wedge face does not take effect. The depth of conveyance of the closing wedge 17 is sized so that, after the conclusion of the pull-to movement phase of the closing wedge 17, the lock studs 6 have been pressed at least into their pre-engagement position in the associated rotary-latch closure 13. This automatically initiates the locking advance of the forked rotary latches 14, by means of which the roof cover 3 is finally pulled into its end position interlocked completely with the roof frame 4. The catch lug 7 thereby lowered deeper into the roof frame 4 thus assumes a lower end position, in which its middle leg is at a distance from the closing wedge 17 in terms of depth. As soon as the locking advance of the forked rotary latches 14 has been initiated, the closing wedge 17 can be pushed in again by retracting the piston rod 20, after which it remains in the sliding channel 18 until a new closing operation. The sequential control of hydraulic cylinders 15 and 19 can be carried out in the conventional way by multi-way valves activated via electrical limit switches.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A pull-to device for a vehicle closing component which, in its closing position, is interlocked with a counter-component, comprising a closure operatively arranged on one of the closing component and counter-component and which, with the closing component open, is maintained in a release position, a lock stud arranged on the other of the closing component and counter-component and interacting with the closure as a result of the closing advance of the closing component, a drive for the closure to pull the lock stud grasped by the closure out of a prelocked initial position into a completely locked end position, a closure insertion orifice through which the lock stud passes being surrounded by a depression centering the lock stud as it is running on a catch coupling comprising a coupling element and a displaceable element operatively arranged for positively coupling the closing component to the counter-component early in a closing-movement phase occurring before the lock stud is inserted into the closure, said coupling element being arranged on the closing component, and said displaceable element arranged on the counter-component for interaction with the coupling element arranged on the closing component, wherein the coupling and displaceable elements are movable relative to one another until the lock stud is pressed down into its prelocked initial position by a pull-to advance of the coupling element.

2. The pull-to device according to claim 1, wherein the coupling and displaceable elements interacting as a catch coupling comprise a catch lug arranged fixedly relative to one of the closing component and the counter-component and a displaceable closing wedge.

3. The pull-to device according to claim 1, wherein the closure is a rotary latch closure.

4. The pull-to device according to claim 1, wherein linear drive means is operatively arranged for driving the closure and for driving the catch coupling.

5. The pull-to device according to claim 4, wherein the linear drive means comprises at least one hydraulic cylinder.

6. The pull-to device according to claim 1, a second closure is arranged at a distance from the first mentioned closure, and the catch coupling is arranged between the closures.

7. The pull-to device according to claim 1, wherein the closure and one of the relatively movable coupling elements are completely countersunk in a cover of the counter-component.

8. The pull-to device according to claim 7, wherein the depression is located in front of the insertion orifice of the closure and is funnel-shaped, and a wedge-shaped catch orifice is provided for single-axis precentering of one of the elements of the catch coupling on the other one of the elements of the catch coupling.

9. The pull-to device according to claim 7, wherein the closure and the displaceable element are arranged on a front roof frame of a convertible automobile, and the lock stud and the coupling element are arranged on a roof cover of a folding top.

* * * * *